United States Patent [19]

Buczek et al.

[11] 4,188,592
[45] Feb. 12, 1980

[54] CLOSED CYCLE CHEMICAL LASER

[75] Inventors: Carl J. Buczek, Manchester, Conn.; Robert J. Freiberg, Palm Beach Gardens, Fla.; David W. Fradin, Exton, Pa.; Peter P. Chenausky, Avon, Conn.

[73] Assignee: United Technologies Corporation, Hartford, Conn.

[21] Appl. No.: 894,776

[22] Filed: Apr. 10, 1978

[51] Int. Cl.² .............................................. H01S 3/095
[52] U.S. Cl. .................................................. 331/94.5 G
[58] Field of Search ..................... 331/94.5 G, 94.5 P, 331/94.5 PE, 94.5 T, 94.5 C

[56] References Cited

U.S. PATENT DOCUMENTS

| 3,720,885 | 3/1973 | Koloc | 331/94.5 G |
| 3,863,176 | 1/1975 | Martinez et al. | 331/94.5 P |
| 3,875,531 | 4/1975 | Buczek et al. | 331/94.5 G |
| 3,886,477 | 5/1975 | Ruby et al. | 331/94.5 G |
| 3,900,804 | 8/1975 | Davis et al. | 331/94.5 T |
| 3,984,784 | 10/1976 | Pinsley | 331/94.5 G |
| 4,031,484 | 6/1977 | Freiberg et al. | 331/94.5 G |

OTHER PUBLICATIONS

Aprahamian et al, "Pulsed Electron-Beam-Initiated Chemical Laser Operating on the $H_2/F_2$ Chain Reaction", App. Phy. Lett., vol. 24, No. 5, Mar. 1, 1974, pp. 239-242.

Fradin et al, "A Recirculating, Self-Contained DF/HF Pulsed Laser", IEEE J. of Quantum Electronics, Aug. 1975, pp. 631-633.

*Primary Examiner*—James W. Davie
*Attorney, Agent, or Firm*—Lawrence A. Cavanaugh

[57] ABSTRACT

A closed cycle chemical laser adapted for continuous wave operation is disclosed. A first gas such as sulphur hexafluoride is decomposed by an electrical discharge means to provide at least some fluorine atoms which when combined with molecular hydrogen in a mixing chamber located upstream of and proximate to an optical power extraction chamber forms an excited laser species capable of stimulated emission to produce a continuous wave output beam. After passing through the optical cavity the effluent is purified by selective absorption and adsorption processes to eliminate the laser species from the effluent and to separate the hydrogen for recirculation back to the mixing chamber. The remaining effluent has its pressure increased, is supplemented with makeup feed gases and is recycled. The operation of the system using sulphur hexafluoride and hydrogen gases is discussed in detail and various combinations of other suitable reactants are disclosed.

24 Claims, 1 Drawing Figure

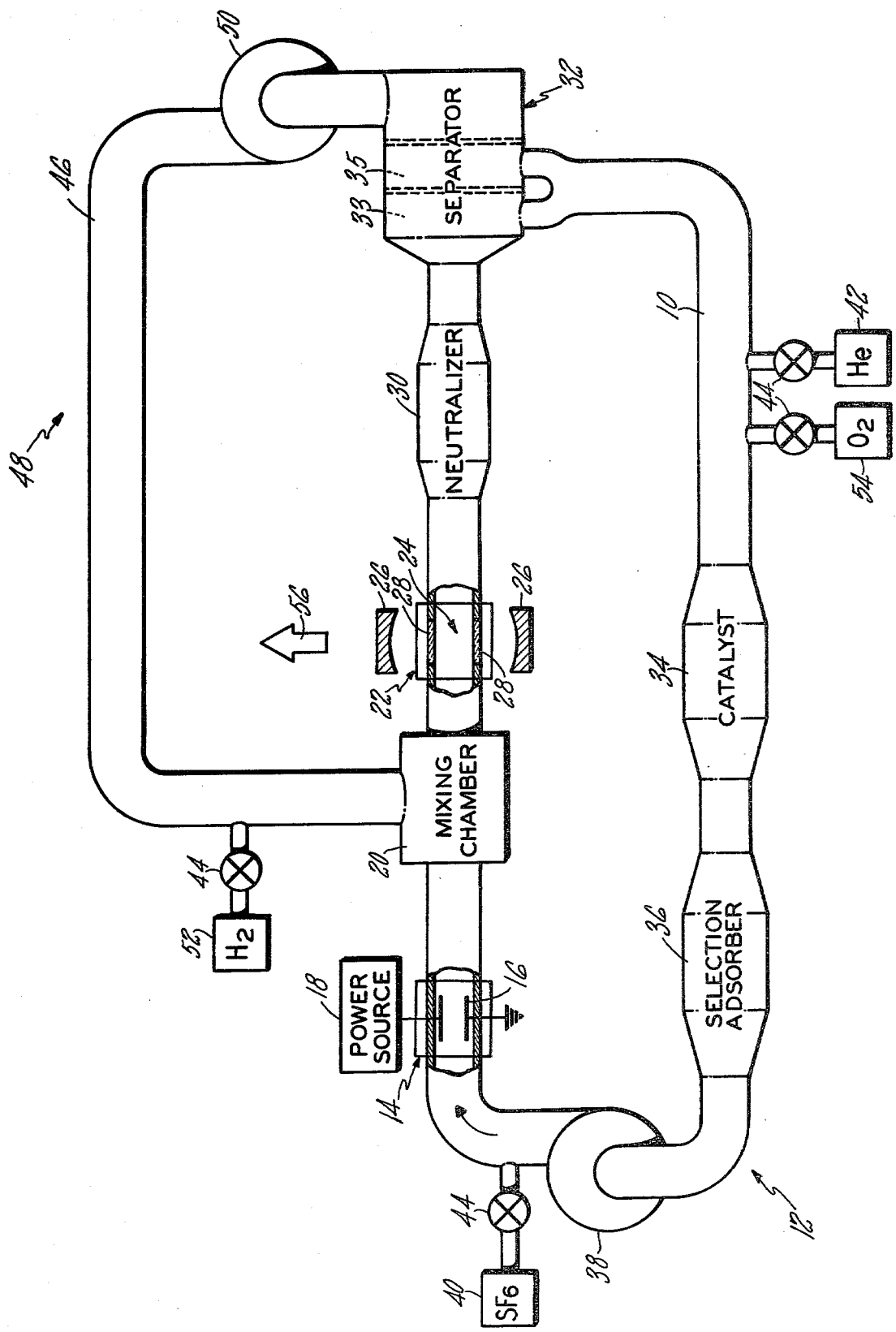

4,188,592

CLOSED CYCLE CHEMICAL LASER

BACKGROUND OF THE INVENTION

The present invention relates to gas lasers and more particularly to a closed cycle gas laser of the chemical type.

Conventional open cycle continuous wave hydrogen fluoride/deuterium fluoride chemical lasers are typically constrained by several disadvantages that limit their range of applications. Foremost is the inherent safety hazards associated with the toxic exhaust of these systems. Additionally, chemical lasers typically have gas handling problems associated with their fluorine bearing fuels and when operated as an open cycle system inherently have large fuel consumptions which can be very costly when gases such as deuterium are employed. Also the weight and inconvenience of the vacuum exhaust pump and the diffuser system required by most conventional continuous wave chemical laser systems have precluded applications where portability is required.

Freiberg et al in U.S. Pat. No. 4,031,484, filed Nov. 11, 1975 and held with the present application by a common assignee discloses an electrically pulsed hydrogen fluoride/deuterium fluoride chemical laser in which the pulsed chemical laser is operated in a totally self-contained recirculating mode. The laser effluent is chemically scrubbed internally to remove any deleterious ground state hydrogen fluoride. The processed gas which consists of a mixture containing unreacted hydrogen and sulphur hexafluoride as well as sulphur hexafluoride derivatives, is replenished with a small amount of makeup gases, i.e., sulphur hexafluoride and hydrogen which is recirculated into the pulse laser discharge region. Between laser pulses, the hydrogen fluoride molecules which were deactivated during the lasing action are swept out of the cavity and are replaced by a fresh gas mixture.

This technique is adaptable only for the pulse mode of operation. In a continuous wave chemical laser system, molecular hydrogen is mixed and reacted with either a supersonic or subsonic flow of atomic fluorine which has been generated by way of a chemical combustion process, an electrical initiation process, or by thermo means well known in the art. For these continuous wave chemical laser systems it is essential that the two primary reactants, which for the case for the hydrogen fluoride laser is molecular hydrogen and atomic fluorine, be introduced into the laser channel separately and mixed slightly upstream of the optical axis of the resonator. In the hydrogen fluoride continuous wave mixing laser, for example, any molecular hydrogen present in the electrical discharge of the sulphur hexafluoride will react quickly with the atomic fluorine produced by the discharge. As a consequence of the rapid vibrational deactivation rates associated with hydrogen fluoride, the population of the ground state energy level within the gas flow increases rapidly resulting in a very effective but highly undesirable quenching of the hydrogen fluoride laser action within the optical cavity.

SUMMARY OF THE INVENTION

An object of the present invention is to provide a chemical laser system having a closed flow loop adapted for continuous wave operation.

According to the present invention, two reactants are combined chemically in the production of an excited molecular species to provide a continuous wave output of laser energy from a chemical laser system having a closed flow loop. The system comprises a first closed flow loop including, means for providing a first gas to the first closed flow loop, means for dissociating at least a portion of the first gas to provide a reaction gas, a mixing chamber adapted for combining the reaction gas with a second gas to provide a working gas having excited energy levels, an optical cavity for stimulating emission of radiation from the excited energy levels of the working gas, a neutralizer adapted for removing the working gas from the effluent passing therethrough, a separator adapted for separating the second gas from the effluent, a chemical scrubber to selectively remove constituents from the effluent, means for providing a third gas to the first closed flow loop, a first circulating means adapted for circulating the gases through the first closed flow loop, and a second closed flow loop adapted for passing the second gas from the separator to the mixing chamber wherein the second closed flow loop includes a second circulating means and means connected to the second closed flow loop for providing the second gas to the mixing chamber.

A primary feature of the present invention is the utilization of two coupled closed loops for circulating gases through the optical cavity to provide a chemical mixing laser capable of continuous wave operation. Additionally in a preferred embodiment a multi-pin cathode is adapted for producing a transverse electric discharge having an arc or near arc condition for dissociating the first gas to provide a continuous flow of reaction gas to the mixing chamber. The second gas admixes with the reaction gas in the mixing chamber to provide a continuous flow of working gas through the optical cavity thereby producing a continuous output beam of radiation from the laser. Sulphur hexafluoride is a preferred first gas and hydrogen or deuterium is a preferred second gas resulting in hydrogen or deuterium fluoride as the working gas. Alternate sources of fluorides and hydrogen or deuterium can be readily substituted for these gases. Additionally in the preferred embodiment the neutralizer includes metal hydroxides to convert the hydrogen/deuterium fluoride to a metal fluoride plus water vapor. The separator includes a sintered quartz film for preferentially passing a major portion of the molecular hydrogen to the second loop while directing the remaining gas into the first loop and a thermally elevated silver palladium membrane cooperating with the sintered quartz film to further filter the hydrogen molecules. Additionally a source of second gas is connected to the second loop for supplying the initial second gas to the mixing region and for replenishing second gas consumed during operation. The chemical scrubber, located within the first loop and typically containing palladium or rhodium, is adapted for reacting a small quantity of oxygen injected into the gas stream from a separate source and any second gas passed into the first loop through the separator to form water vapor. Zeolite beds selectively remove the water vapor from the system. A source of first gas such as sulphur hexafluoride is connected to the first loop for supplying the initial gas to the means for dissociating the first gas and for replenishing first gas irreversibly lost by the generation of and subsequent removal of the working gas during recirculation. Efficient, lightweight circulators, typically of the flex vane blower type, provide circulating means within the first and second loops. Helium gas is maintained within the laser system to enhance the characteristics of the discharge.

A primary advantage of the present invention is the generation of a continuous output beam. Additionally the fuel for the laser system is readily storable and relatively easy to use. Also recycling the gases through the laser eliminates the problems associated with exhausting toxic gases into the atmosphere. The loop systems provide low pressure drop recycling systems capable of operating with low pressure head pumping equipment which are efficient to operate and occupy a small volume. Additionally the discharge characteristics can be optimized for maximum production of fluorine atoms without interfering with the conditions for optimum optical power generation in the extraction region. Also sulphur products generated in the dissociation chamber plate out on the conduit walls upstream of the extraction chamber which minimize contamination of the optical windows within the optical cavity.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

The FIGURE is a simplified schematic of a closed cycle chemical laser adapted for continuous wave operation in accordance with the present invention.

DESCRIPTION OF THE PREFERRED EMBODIMENT

The FIGURE is a simplified schematic of the present invention showing an electrically energized closed cycle chemical mixing laser adapted for continuous wave operation. A first conduit 10 forms a first closed loop 12 within which the main components of the system interact. Located within the first loop is a dissociation chamber 14 including electrodes 16 disposed across the interior of the first conduit and connected to a power supply 18, a mixing chamber 20 located downstream the dissociation chamber, an extraction chamber 22 having an optical cavity 24 formed between mirrors 26 and windows 28 fitted into the side walls of the extraction chamber, a neutralizer 30 positioned downstream the extraction chamber, a separator 32, a first scrubber 34, a second scrubber 36 and a first circulator 38. A source of first gas 40 and a source of helium gas 42 are connected to the first conduit with suitable control valves 44. A second conduit 46 forms a second closed loop 48 adapted for circulating a second gas, selectively removed from the effluent by the separator, to the mixing chamber. Located within the second loop is a second circulator 50. A source of second gas 52 is connected to the second conduit with a suitable control valve 44 and a source of oxidizer gas 54 is connected to the first loop 12 with a suitable control valve 44.

In order to simplify the following description, the operation of the present invention is described on the basis of a mixture of sulphur hexafluoride as the first gas and molecular hydrogen as the second gas although it will be evident from the overall disclosure and subsequent discussion that various other gases will operate satisfactorily. To initiate operation of the system the first circulator 38 is activated by energizing a direct current drive motor not shown in the FIGURE. Sulphur hexafluoride and helium gas are admitted to the first conduit 10 from sources 40, 42 through the control valves 44 to provide a total gas pressure within the first loop typically between one and twenty-five torr with a partial pressure of sulphur hexafluoride between 0.1 to 1.0 torr. The gas mixture flows in a clockwise direction through the first loop as shown by the arrow and passes into the decomposition chamber 14. Energy from the power supply 18 is deposited between the electrodes 16 to provide a direct current discharge within the gas.

In the preferred embodiment the discharge is maintained in an arc or near arc condition with the electrodes transversely disposed to the path of the gas and having a multi-pin cathode configuration. The action of the electric discharge between the electrodes causes fluorine atoms to become separated from the sulphur hexafluoride gas. The discharge is maintained in an arc or near arc condition to maximize the production of fluorine atoms and helium gas is added to enhance the discharge. The helium gas is not detrimental to the operation of the laser. The gas mixture flows into the mixing chamber wherein the free fluorine atoms react with molecular hydrogen supplied from the second loop 48 to provide hydrogen fluoride molecules having excited energy levels in a manner well known in the art of gas mixing lasers. The initial molecular hydrogen gas is provided from source 52 and the partial pressure of the hydrogen gas within the system is maintained at a typical pressure variable from 0.05 to 0.5 torr with the control valve 44. The effluent from the mixing chamber flows through the extraction chamber 22 where stimulated emission of laser radiation from the excited energy levels of the hydrogen fluoride gas provide an output beam 56 of laser radiation. The dissociation chamber is sufficiently removed from the extraction chamber to enable an arc or near arc discharge condition to be maintained to produce a copious supply of fluorine atoms without disturbing the flow conditions within the optical cavity. Additionally the separation enables the extraction chamber to be of metallic construction to provide enhanced cooling capabilities without concern for electrical problems associated with the discharge. Also the separation is sufficient to enable sulphur and sulphur products generated in the discharge to be deposited along the conduit walls upstream the extraction chamber. The extraction chamber is preferably in close proximity to the mixing chamber and the two may be coincident to minimize deactivation of the hydrogen fluoride energy levels.

The effluent from the extraction chamber passes into a neutralizer 30 which contains a reactive bed of suitable metal hydroxide pellets such as sodium hydroxide. The hydrogen fluoride in the effluent reacts with the metal hydroxide to form a fluoride salt, which remains in the neutralizer, and water vapor which continues to move through the neutralizer with the effluent and passes into the separator 32. The separator selectively removes molecular hydrogen from the effluent passing therethrough by diffusion into the second loop 46 while readily passing the effluent through the first loop 12.

The separator preferably includes two diffusers. A first diffuser 33 typically a sintered quartz film or a methyl silicon membrane preferentially passes a major portion of the hydrogen and helium gases while directing the remaining gases through the first loop and a second diffuser 35 typically a thermally elevated silver palladium or ruthenium palladium membrane is positioned downstream the first diffuser and effectively passes only the hydrogen molecules into the second loop while directing the helium gas into the first loop. To avoid poisoning the silver palladium or the ruthenium palladium membrane it is required that the membranes be isolated from the sulphur compounds such as sulphur hexafluoride, sulphur oxide, hydrogen sulfide and any reactive molecules such as hydrogen fluoride which typically are generated in a hydrogen fluoride laser. Consequently prior neutralization of the hydrogen fluoride molecules and the use of the sintered quartz film are essential to the successful operation of the separator.

The second circulator 50 located within the second loop 48 is adapted for circulating the hydrogen molecules from the separator to the mixing region. During operation some of the original hydrogen gas is converted to hydrogen fluoride within the mixing region which is subsequently removed from the circulating gas. A small replenishment of hydrogen gas is required to maintain a relatively constant pressure of hydrogen within the mixing region. The pressure is maintained by controlling the flow of gas from the source 52 connected to the second loop with the control valve 44.

The effluent directed by the separator through the first loop typically contains some unreacted hydrogen gas which must be removed before the effluent is recirculated through the dissociation chamber. The first scrubber 34 typically employs a catalyst such as palladium or rhodium deposited on molecular sieve type material which reacts with a small quantity of oxygen introduced through the control valves 44 from the source of oxidizer gas 54 to form water vapor. Typically a small quantity of oxygen somewhat in excess of the residual hydrogen concentration is introduced for reaction with the catalyst. The water vapor is then selectively absorbed within the second scrubber 36 typically containing zeolite in a reactive bed. The zeolite is a highly porous alkaline metal aluminum silicate compound which absorbs water vapor and other polar gas containments such as unreacted hydrogen fluoride which may exist in the effluent after passing through the neutralizer. The composition of the effluent entering the circulator 38 is essentially sulphur hexafluoride, hydrogen, sulphur hexafluoride derivatives and possibly some hydrogen fluoride, although the amount of the hydrogen fluoride would be less than about one tenth of one percent of the total gas pressure. The effluent undergoes a pressure rise of several torr in passing through the first circulator and is passed into the decomposition chamber where the operational sequence is repeated. Additional amounts of sulphur hexafluoride are added to the effluent upstream of the decomposition chamber to compensate for the losses from the various chemical reactions throughout the system to maintain a relatively constant partial pressure of sulphur hexafluoride.

A preferred type of first and second circulators 38, 50 is described in U.S. Pat. No. 3,875,531 entitled "Integrated Laser System". Typically an electric motor drives the circulator through a magnetic coupler and gas flow results from the motion of flexible vanes inside the circulator. Since the circulators operate at a low pressure head, the circulators are much lighter than typical mechanical pumps otherwise required in large pressure differential systems. The presence of helium and oxygen within the flowing gas system is not deleterious to the laser operation and is instrumental in improving the discharge characteristics. It is important to note that as a consequence of the effective reclamation of the unreacted fuel, the total gas replenishment rate of the sulphur hexafluoride, molecular hydrogen, and molecular oxygen is far less than that associated with an open cycle operation for comparable power extraction. For laser systems which employ a large amount of deuterium or other expensive fuel, the recirculating concept can result is a significantly reduced operating cost.

Although the preferred embodiment of this system uses sulphur hexafluoride and molecular hydrogen, other gas mixtures can be used. Sulphur hexafluoride can be replaced by carbon tetrafluoride and other freons, tetrafluorohydrazine, nitrogen fluoride or other gases containing other halogens such as chlorine and bromine. The hydrogen may be replaced by deuterium, deuterated hydrocarbons, or various hydrocarbons such as ethane.

Although the preferred embodiment includes an electric discharge operating in an arc or near arc condition, it is to be recognized that an electrical discharge operating in a glow discharge condition, chemical means or electron beam means may be utilized to initiate and sustain a discharge to dissociate the fluorine containing gas compound.

In the preferred embodiment total gas pressures typically less than twenty-five torr are maintained within the system. In one embodiment one watt of continuous optical power has been obtained for a laser system having a total pressure of 9.3 torr with partial pressures of 0.5 torr of sulphur hexafluoride, 0.25 torr of molecular hydrogen, and 8.65 torr of helium gas. Typically the partial pressures of the molecular hydrogen and the sulphur hexafluoride remain relatively constant with total pressure variations being predominantly accounted for by variations in the helium pressure.

One of the major advantages provided by a closed loop chemical laser system is that the need to work against a sizable pressure differential associated with the open cycle systems in exhausting from a relatively low pressure to atmospheric pressure is eliminated which significantly reduces the work load for the gas circulator. The flex vane blower employed in the two loops of the system is designed for efficient operation at pressures even below one hundred torr. In contrast to conventional fans the unique construction of the flex vane blower allows it to effectively overcome pressure drops presented by the various components within the two loops. The use of this lightweight compact gas circulator results in a major system weight reduction and significantly less electrical power consumption as compared to the bulky mechanical vacuum pumps employed in conventional open cycle systems.

Although this invention has been shown and described with respect to a preferred embodiment thereof it should be understood by those skilled in the art that various changes and omissions in the form and detail thereof may be made without departing from the spirit and scope of the invention.

Having thus described a typical embodiment of our invention that which we claim as new and desire to secure by Letters Patent of the United States is:

1. A chemical laser system of the mixing type for continuous wave operation comprising:
    a first closed loop through which a gaseous medium may be repeatedly circulated;
    means for controllably supplying a first gas to the first closed loop;
    a dissociation chamber including means for dissociating at least a portion of the first gas to provide a reaction gas, said dissociating means being downstream of the position at which the first gas is admitted to the first closed loop;

a mixing chamber located downstream the means for dissociating the first gas wherein the mixing chamber is adapted for combining the reaction gas with a second gas to provide a working gas having excited energy levels from which laser radiation can be extracted;

optical means located either immediately downstream of or coincident with the mixing chamber for extracting laser radiation from the working gas;

a neutralizer located downstream the optical means adapted for removing the working gas from the effluent passing therethrough;

a separator located downstream of the neutralizer for separating the second gas from the effluent;

scrubber means for removing undesired constituents in the effluent passing therethrough, said scrubber means being located downstream of the separator;

means for controllably providing a third gas to the first closed loop;

a first circulating means for continuously pumping the effluent through the first closed loop; and a second closed loop for passing the second gas separated from the effluent by the separator to the mixing chamber wherein the second closed loop includes a second circulating means for pumping the second gas through the second loop and means connected to the second loop for controllably providing the second gas to the second closed loop from a source of second gas.

2. The invention in accordance with claim 1 wherein the means for dissociating the first gas comprises:

a pair of electrodes spaced apart; and a source of electrical power for providing an electric potential across the two electrodes to provide an arc or near arc discharge condition within the first gas.

3. The invention in accordance with claim 2 wherein the pair of electrodes includes a pin type cathode.

4. The invention in accordance with claim 2 wherein the electrodes are transversely disposed to the direction of flow of the first gas.

5. The invention in accordance with claim 2 wherein the source of electrical power for providing the electric potential across the two electrodes is adapted for continuously supplying the electrical power.

6. The invention in accordance with claim 1 wherein the neutralizer includes metal hydroxides to remove undesired constituents from the effluent by chemical reaction.

7. The invention in accordance with claim 1 wherein the separator includes a first diffuser for preferentially passing a major portion of the second and third gases while directing the residual effluent gases to the scrubber means, and a second diffuser for preferentially passing the second gas passed through the first diffuser to the second closed loop while directing the third gas to the scrubber means.

8. The invention in accordance with claim 7 wherein the first diffuser is a sintered quartz film.

9. The invention in accordance with claim 7 wherein the first diffuser is a methyl silicon membrane.

10. The invention in accordance with claim 7 wherein the second diffuser is a silver palladium membrane maintained at an elevated temperature.

11. The invention in accordance with claim 7 wherein the second diffuser is a ruthenium palladium membrane maintained at an elevated temperature.

12. The invention in accordance with claim 6 wherein the metal hydroxides are selected from the group consisting of sodium hydroxide, magnesium hydroxide or calcium hydroxide.

13. The invention in accordance with claim 1 wherein the scrubber means includes a first scrubber containing a catalyst deposited on a molecular sieve type material to selectively remove undesired constituents from the effluent, and a second scrubber containing pellets of zeolite to selectively remove undesired constituents from the effluent by physical adsorption.

14. The invention in accordance with claim 13 wherein the catalyst is selected from the group consisting of palladium and rhodium.

15. The invention in accordance with claim 1 wherein the first gas is selected from a group consisting of sulphur hexafluoride, freons, tetrafluorohydrazine and nitrogen fluoride.

16. The invention in accordance with claim 1 wherein the second gas is selected from the group consisting of hydrogen, deuterium and ethane.

17. The invention in accordance with claim 1 wherein the first gas is sulphur hexafluoride and the second gas is hydrogen.

18. The invention in accordance with claim 1 wherein the third gas is helium.

19. The method of operating a closed cycle chemical laser to provide a continuous output beam comprising the steps of:

admitting a first gas to a first closed loop through which gases are continuously circulated;

dissociating the first gas to form a species of atomic gas;

reacting the species of atomic gas with a second gas chemically within a mixing chamber to form a working gas having a population inversion of energy states suitable for stimulated emission of radiation, said reacting being accomplished either coincident with or immediately upstream of an optical cavity;

passing the excited working gas through an optical cavity to stimulate the emission or radiation;

passing the effluent from the optical cavity through a neutralizer to substantially remove the working gas from the effluent;

flowing the effluent through a separator to substantially remove the second gas from the effluent and passing the separated second gas through a second loop to the mixing chamber for admixing with the atomic species;

increasing the pressure of the second gas passing through the second loop by passing the second gas through a second circulating means;

passing the residual effluent from the separator through a chemical scrubber to remove undesired constituents from the effluent;

increasing the pressure of the gases circulating within the first closed loop by passing the gases through a first circulating means; and admixing appropriate amounts of the first gas to the first loop and the second gas to the second loop to maintain a continuous flow of working gas through the optical cavity.

20. The invention in accordance with claim 19 wherein the first gas is dissociated with an electric potential transversely applied across a pair of electrodes to form an electric discharge within the gas wherein the discharge is maintained in an arc or near arc condition.

21. The invention in accordance with claim 20 further including admitting a third gas to the first closed loop for enhancing the characteristics of the discharge within the gas.

22. The invention in accordance with claim 19 further including admixing appropriate amounts of oxygen gas to the chemical scrubber to enhance the removal of undesired constituents from the effluent.

23. The invention in accordance with claim 19 wherein the gases circulating within the laser are maintained at a pressure of less than twenty-five torr.

24. The invention in accordance with claim 23 wherein the first gas is maintained at a partial pressure between 0.1 to 1.0 torr, and the second gas is maintained at a pressure between 0.05 to 0.5 torr.

* * * * *